(12) United States Patent
Ide et al.

(10) Patent No.: US 6,183,656 B1
(45) Date of Patent: Feb. 6, 2001

(54) METHOD OF DETECTING END POINT OF POLISHING OF WAFER AND APPARATUS FOR DETECTING END POINT OF POLISHING

(75) Inventors: Satoru Ide; Tsutomu Yamada; Norio Hayashi, all of Kanagawa (JP)

(73) Assignee: Okamoto Machine Tool Works, Ltd., Yokohama (JP)

( * ) Notice: Under 35 U.S.C. 154(b), the term of this patent shall be extended for 0 days.

(21) Appl. No.: 09/519,879

(22) Filed: Mar. 6, 2000

(30) Foreign Application Priority Data

Aug. 5, 1999 (JP) ............................................. 11-253397

(51) Int. Cl.$^7$ .......................... H01L 21/302; B44C 1/22
(52) U.S. Cl. .................................. 216/85; 216/88; 438/8; 438/692
(58) Field of Search ..................... 216/22, 85, 88, 216/89; 438/7, 8, 692, 693

(56) References Cited

U.S. PATENT DOCUMENTS

| | | | |
|---|---|---|---|
| 5,439,551 | * | 8/1995 | Meikle et al. .................... 156/626.1 |
| 5,876,266 | * | 3/1999 | Miller et al. ............................ 451/36 |
| 6,001,269 | * | 12/1999 | Sethuraman et al. .................. 216/89 |
| 6,024,886 | * | 2/2000 | Han et al. ............................... 216/38 |
| 6,071,818 | * | 6/2000 | Chisholm et al. .................... 438/692 |
| 6,077,147 | * | 6/2000 | Yang et al. ............................... 451/6 |
| 6,110,831 | * | 8/2000 | Cargo et al. .......................... 438/692 |
| 6,117,777 | * | 9/2000 | Zhou et al. ........................... 438/692 |
| 6,117,779 | * | 9/2000 | Shelton et al. ....................... 438/692 |

FOREIGN PATENT DOCUMENTS 57-212609 * 12/1982 (JP).

OTHER PUBLICATIONS

Copending U.S. application No. 09/454,530, filed Dec. 6, 1999.*

* cited by examiner

Primary Examiner—Gregory Mills
Assistant Examiner—George Goudreau
(74) Attorney, Agent, or Firm—Oblon, Spivak, McClelland, Maier & Neustadt, P.C.

(57) ABSTRACT

A method of detecting an end point of polishing arranged to perform CMP polishing with which an insulating layer of a wafer incorporating a substrate having a metal-containing permalloy layer formed thereon and the insulating layer formed on the metal-containing permalloy layer is chemi-mechanically polished to expose the flat permalloy layer, the method of detecting an end point of polishing, having the steps of: collecting abrasive material slurry on a surface plate for polishing as a continuous flow from the start or during CMP polishing; continuously mixing a color developing reagent with the collected continuous flow to prepare a specimen for the continuos flow; reading the color of the specimen as a digital value (Ii) by a color identifying sensor; and determining a moment of time at which the digital value (Ii) reaches a digital value (Io) of a specimen of a waste flow of the abrasive material slurry at the end of polishing to be the end of CMP polishing.

5 Claims, 10 Drawing Sheets

METHOD OF DETECTING END POINT OF POLISHING OF WAFER AND APPARATUS FOR DETECTING END POINT OF POLISHING

BACKGROUND OF THE INVENTION

1. Field of the Invention

The present invention relates to a method of detecting an end point of polishing. The detection is performed such that a wafer having a permalloy magnetic layer constituted by forming a permalloy magnetic layer made of permalloy containing metal, such as iron, nickel or cobalt, such as Ni—Fe, Mn—Fe, Co—Fe Ni—Rh—F, Co—Zr—Fe, Co—Fe—B, on the surface of a substrate made of silicon, an alumina-titanium carbide (AlTiC) alloy or glass and having a circuit made of Cu, Ag or Au formed if necessary and furthermore incorporating an insulating layer made of aluminum oxide or the like is joined to a chuck. Then, the wafer is pressed against a platen having a polishing cloth or a lapping surface plate (hereinafter the platen and the lapping surface plate are generally called a "polishing surface plate" and a CMP polishing apparatus and a lapping apparatus are generally called a "CMP polishing apparatus") made of copper, tin, aluminum or plastic. While supplying abrasive material slurry to the surface of the polishing surface plate, the polishing surface plate and the wafer are rotated to polish the insulating layer to perform chemimechanical polishing (CMP) until the permalloy layer is exposed to the outside. As an alternative to this, the wafer is sucked to a chuck table by using a vacuum to downwards and then a platen to which a polishing cloth is bonded, namely a polishing pad, is pressed against the upper surface of the wafer. While supplying abrasive material slurry to the platen or supplying abrasive material slurry to the upper surface of the wafer, the platen and the wafer are rotated to polish the insulating layer to perform chemimechanical polishing (CMP) until the permalloy layer is exposed. The present invention also relates to an apparatus for detecting an end point of polishing.

2. Description of the Related Art

For example, a magnetic recording head substrate is, as shown in FIGS. 2A to 2D, manufactured such that a permalloy layer 3 is formed on a substrate 2. Then, a wafer 1 (see FIG. 2A) having an aluminum insulating layer formed thereon is polished by chemimechanical polishing (CMP) until the permalloy layer is exposed to the outside (see FIG. 2D). Also the CMP polishing operation is performed when a device wafer is manufactured as a substitute for the magnetic head substrate. At this time, a structure consisting of 2 to 10 permalloy layers and device layers is sometimes constituted.

When the water is polished as described above, automatic polishing free of no manpower is required from the market. A variety of pieces of automatic CMP apparatus for automatically detecting an end point of polishing have been suggested.

The end point of polishing is detected by any one of the following methods.

(1) A method for determining the end point in accordance with an amount of polishing by measuring a change of the thickness of the wafer which is being polished by a thickness meter (refer to Japanese Patent Laid-Open No. 62-257742, Japanese Patent Laid-Open No. 9-193003, Japanese Patent Laid-Open No. 10-106984 and Japanese Patent Laid-Open No. 10-98016).

(2) A method for determine the end point in accordance with a load electric current, voltage or change in the resistance of the motor which rotates the platen or the chucking mechanism during the polishing operation (refer to Japanese Patent Laid-Open No. 61-188702, Japanese Patent Laid-Open No. 6-252112, Japanese Patent Laid-Open No 8-99625, Japanese Patent Laid-Open No. 9-70753, Japanese Patent Laid-Open No. 10-44035, Japanese Patent Laid-Open No. 10-128658 and Japanese Patent Laid-Open No. 10-177976).

(3) A method determining the end point of polishing in accordance with change in the torque of the motor which rotates the platen or the chucking mechanism during the polishing operation (refer to Japanese Patent Laid-Open No. 5-138529, Japanese Patent Laid-Open No. 6-216095, Japanese Patent Laid-Open No. 8-139060, Japanese Patent Laid-Open No. 8-197417, Japanese Patent Laid-Open No. 9-36073, Japanese Patent Laid-Open No. 9-262743 and Japanese Patent Laid-Open No. 10-256209).

(4) A method in which the wafer being polished is irradiated with a laser beam to determine the end point of polishing in accordance with the quantity of reflected light (refer to Japanese Patent Laid-Open No. 57-138575, Japanese Patent Laid-Open No. 61-214970, Japanese Patent Laid-Open No. 4-255218, Japanese Patent Laid-Open No. 5-309559, Japanese Patent Laid-Open No. 7-328916, Japanese Patent Laid-Open No. 8-174411 Japanese Patent Laid-Open No. 9-7985 and Japanese Patent Laid-Open No. 10-160420).

(5) A method with which a color sensor is disposed opposite to a chuck for holding a device substrate which has an interlayer insulating film on which a metal film has been formed to detect the color of the interlayer insulating film which has been chemimechanically polished (refer to JP-A-11-70467).

(6) A method in which phosphorus or tracer particles serving as an index is added to the polishing-material slurry to measure the quantity of the index on the polishing cloth so as to determine the end point of polishing (refer to Japanese Patent Laid-Open No. 2-241017 and Japanese Patent Laid-Open No. 8-69987).

The method (1) in which the thickness of the wafer is measured is arranged such that the thickness of only a part of the wafer is measured. Since a long time is required to measure the distribution of thicknesses of the overall portion of the wafer, only a poor accuracy can be realized.

Each of the determining method (2) in which the electric current, the voltage or the resistance is used and the method (3) in which the torque is used, is not a method of directly observing the surface of the polished wafer. Also only a poor accuracy of flattening can be obtained.

The method (4) in which the quantity of reflected laser beam is used, is arranged such that the wafer is directly irradiated with the laser beam to determine the end point in accordance with the quantity of reflected light. Therefore, presence of water of the polishing-material slurry for use in the CMP polishing process on the surface of the wafer causes data to be scattered. Hence it follows that an apparatus for cleaning and drying the position on the surface of the wafer on which the laser beam is made incident and from which the same is reflected must be joined. Therefore, the foregoing method cannot be employed when the size of the CMP apparatus is reduced. What is worse, the cost of the apparatus cannot be reduced. Moreover, the polishing process is interrupted because the cleaning and drying processes of the wafer have to be performed. The method (5) with which the color sensor is employed is free of description about a specific embodiment (computer soft program) of detecting the end point of polishing. Moreover, it is difficult to instantaneously observe the overall surface of the device wafer by one color sensor when a consideration is made from the disclosed drawings. Therefore, the method cannot be employed from a viewpoint of practical use.

The method (5) in which the index is added cannot be employed because the index's influences on polishing of the wafer and on a post-process performed after the CMP polishing process has been completed are not known.

SUMMARY OF THE INVENTION

The inventors of the present invention have focused attention on the metal material contained in the permalloy layer and the metal layer. Thus, a fact has been detected that metal materials mixed with the waste solution of abrasive material slurry together with the insulating material as trash have been formed into ions (when the metal is iron, trivalent Fe ions). The physical quantity (Co) detected in accordance with the concentration or metal ions in the abrasive material slurry realized when the polished wafer in an optimum state is read as a digital value (Ii) of a color identifying sensor. Then, a comparison is made with a digital value (Ti) caused from the physical quantity of metal ions in the waste solution of abrasive material slurry during the polishing operation and obtained by a color identifying sensor. A moment of time at which the value of Ii reaches Io is determined as an end point of polishing. Thus, a fact that detection of an end point of polishing can be performed more accurately as compared with the conventional method has been detected. Thus, the present invention has been established.

According to a first aspect of the present invention, there is provided a method of detecting an end point of polishing arranged to perform CMP polishing with which an insulating layer of a wafer incorporating a substrate having a metal-containing permalloy layer formed thereon and the insulating layer formed on the metal-containing permalloy layer is chemimechanically polished to expose the flat permalloy layer, the method of detecting an end point of polishing, comprising the steps of: collecting abrasive material slurry on a surface plate for polishing as a continuous flow from the start or during CMP polishing; continuously mixing a color developing reagent with the collected continuous flow to prepare a specimen for the continuos flow; reading the color of the specimen as a digital value (Ii) by a color identifying sensor; and determining a moment of time at which the digital value (Ii) reaches a digital value (Io) of a specimen of a waste flow of the abrasive material slurry at the end of polishing to be the end of CMP polishing.

As the polishing operation proceeds, chips of permalloy or the metal layer produced during the polishing operation and trash of insulating layer added to the waste solution of the abrasive material as well as the slurry components of the abrasive material. Thus, the composition ratio of the waste solution varies as time elapses. Therefore, an experiment is performed to previously obtain a color value (Io) correlating to the content (Co) of specific metal ion substance in the waste solution of the abrasive material in the optimum polishing state. Then, a color value (Ii) correlating to the content of the substance in the waste solution of the abrasive material slurry of the abrasive material slurry during the polishing operation is monitored by a color identifying sensor. A moment of time at which the color value (Ii) coincides with the color value (Io) at the end of polishing is determined as an end of polishing. Thus, the polishing process can be completed in a state where a predetermined area ratio of the permalloy and the insulating material is maintained.

A second aspect of the invention is characterized in that the metal contained in the permalloy layer is iron, the color developing reagent contains coloring matter and hydrogen peroxide water, and the value detected by the color identifying sensor as the digital value (Ii) is a color value of the specimen of the waste flow of the abrasive material slurry color-developed owing to iron ions in the abrasion material slurry.

Since iron ions even in a small quantity can be colored with the color developing reagent, the waste solution can be colored within the wafer throughput (two minutes to six minutes) in the CMP process. Therefore, the end point can be determined by operating the color sensor.

A third aspect of the invention is characterized in that coloring matter is N,N-dialkyl-p-phenylene diamine (where the number of carbon atoms in the alkyl group is 1 or 2).

Among a variety of coloring matter for iron ions, N,N-dialkyl-p-phenylene diamine can be colored most quickly in the presence of an oxidizer.

A fourth aspect of the invention is characterized in that the specimen of the waste solution of the abrasive material slurry is added with a buffer solution as well as the color matter which develops color in the presence of iron ions and hydrogen peroxide water.

When the buffer solution is blended, the state of the specimen can be stabilized. Thus, deviation of the color value as the time elapses can be eliminated, the color value being used to detect the end point of polishing after a wafer which is newly polished has been conveyed and the CMP polishing operation has been repeated.

A fifth aspect of the invention is characterized in that the metal contained in the permalloy layer is nickel, and the color-developing reagent is dimethyl oxime.

The color-developing reagent varies according to metal contained in the permalloy on which attention is focused. When nickel ions are detected, dimethyl oxime is employed.

According to a sixth aspect of the present invention, there is provided an apparatus for detecting an end point of polishing of a wafer adaptable to a CMP polishing apparatus with which an insulating layer of a wafer incorporating a substrate having a metal-containing permalloy layer formed thereon and the insulating layer formed on the metal-containing containing permalloy layer is chemimechanically polished to expose the flat permalloy layer, the apparatus for detecting an end point of polishing comprising: a scraper for collecting waste solution of abrasive material slurry on a polishing surface plate; a roller pump for pumping up the waste solution of polishing material slurry collected by the scraper as a continuous flow to send the waste solution of the abrasive material slurry collected by the scraper to a temperature regulator; a reagent supply mechanism for continuously supplying color-developing reagent to the flow of the waste solution of the abrasive material slurry pumped up by the roller pump; a color identifying sensor for reading, as a digital value (Ii), the color of a specimen of the waste flow of the abrasive material slurry containing the color-developing reagent sent to the temperature regulator; a mechanism for making a comparison between the digital value (Ii) read by the color identifying sensor and a digital value (Io) of a specimen of the waste flow of the abrasive material slurry containing the color-developing reagent in a state where CMP polishing has been completed which has been read by a color identifying sensor and input previously; a mechanism for transmitting a signal when the measured value (Ii) has reached the value (Io) input previously; and a mechanism for indicating completion of CMP polishing of the wafer in response to the signal.

Since a state of polishing can be detected by the color identifying sensor in a real time manner, the CMP process can be automated.

Each of FIGS. 2A to 2D is a cross sectional view showing a state of polishing of the wafer which is changed as time elapses.

Figure 3:
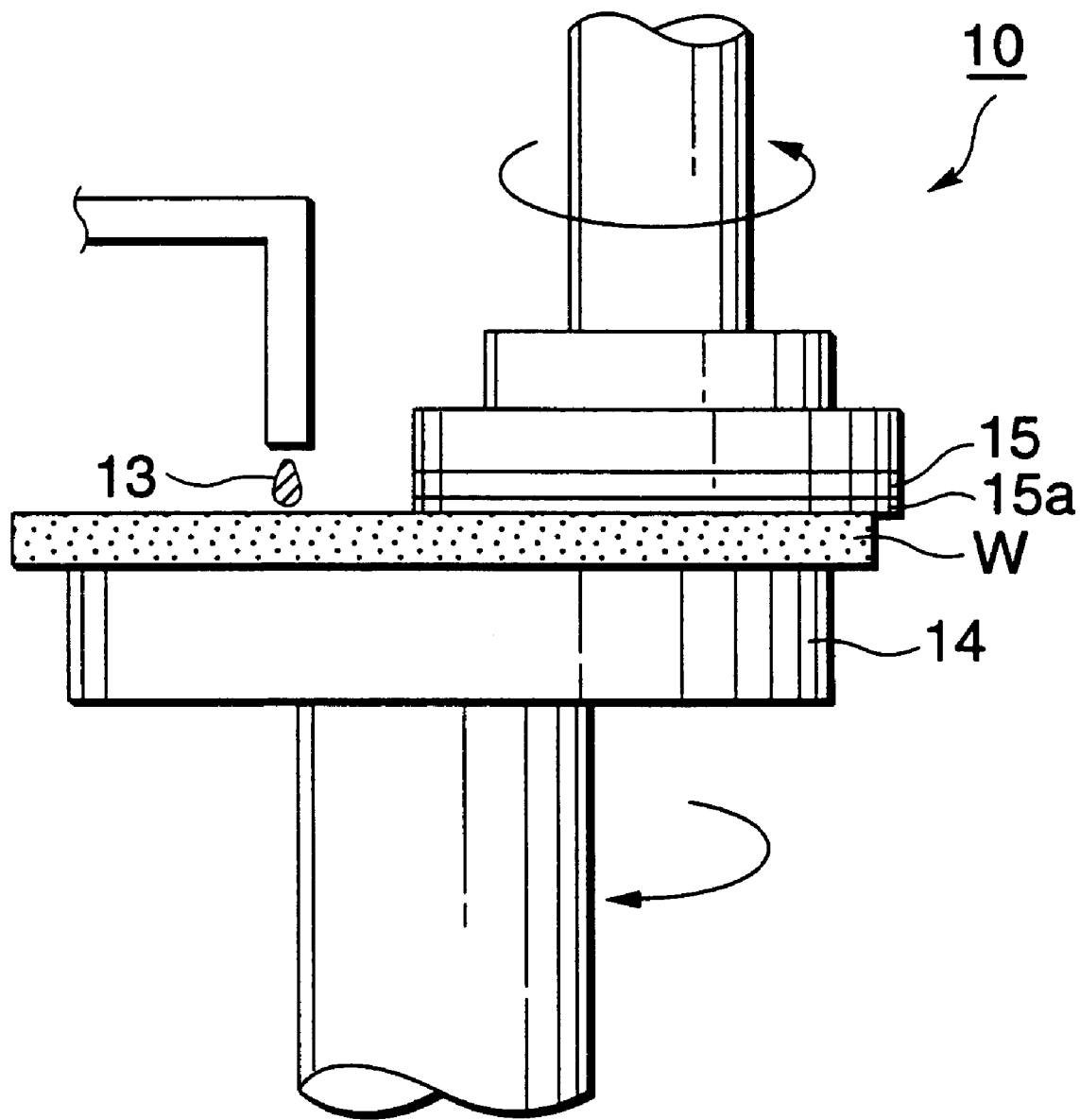

FIG. 3 is a cross sectional view showing an example of the CMP apparatus.

Figure 4:
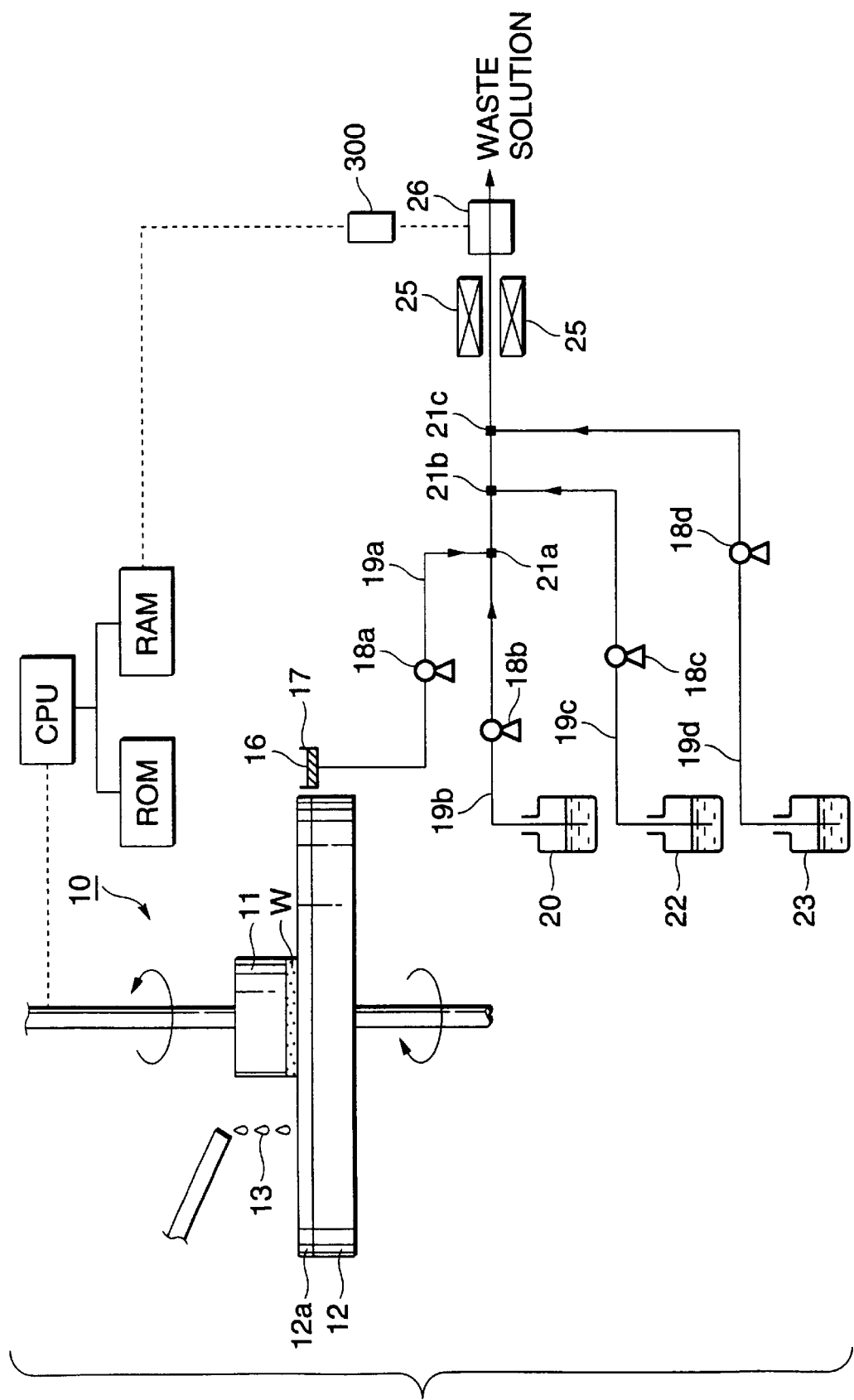

FIG. 4 is a cross sectional view showing another embodiment of the CMP apparatus having the apparatus for detecting an end point of polishing.

Figure 5:
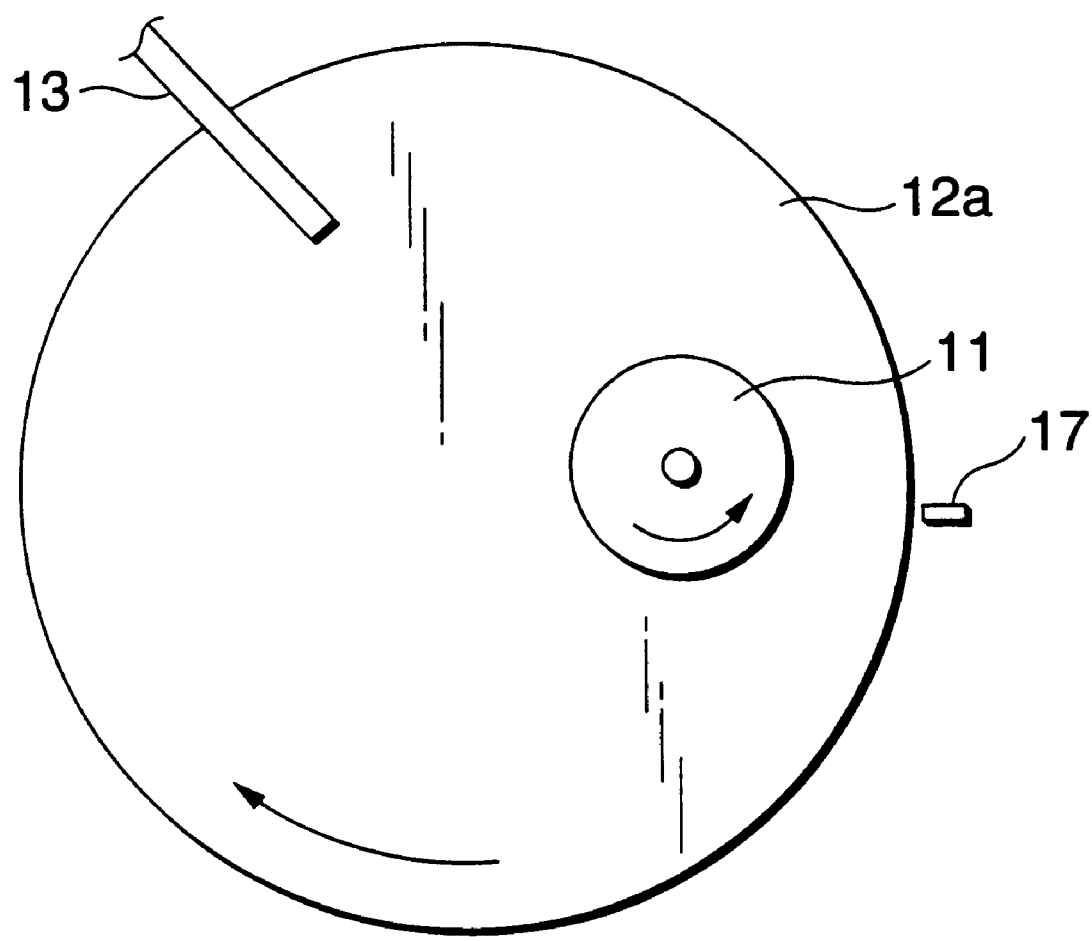

FIG. 5 is a top view showing the CMP apparatus.

Figure 6:
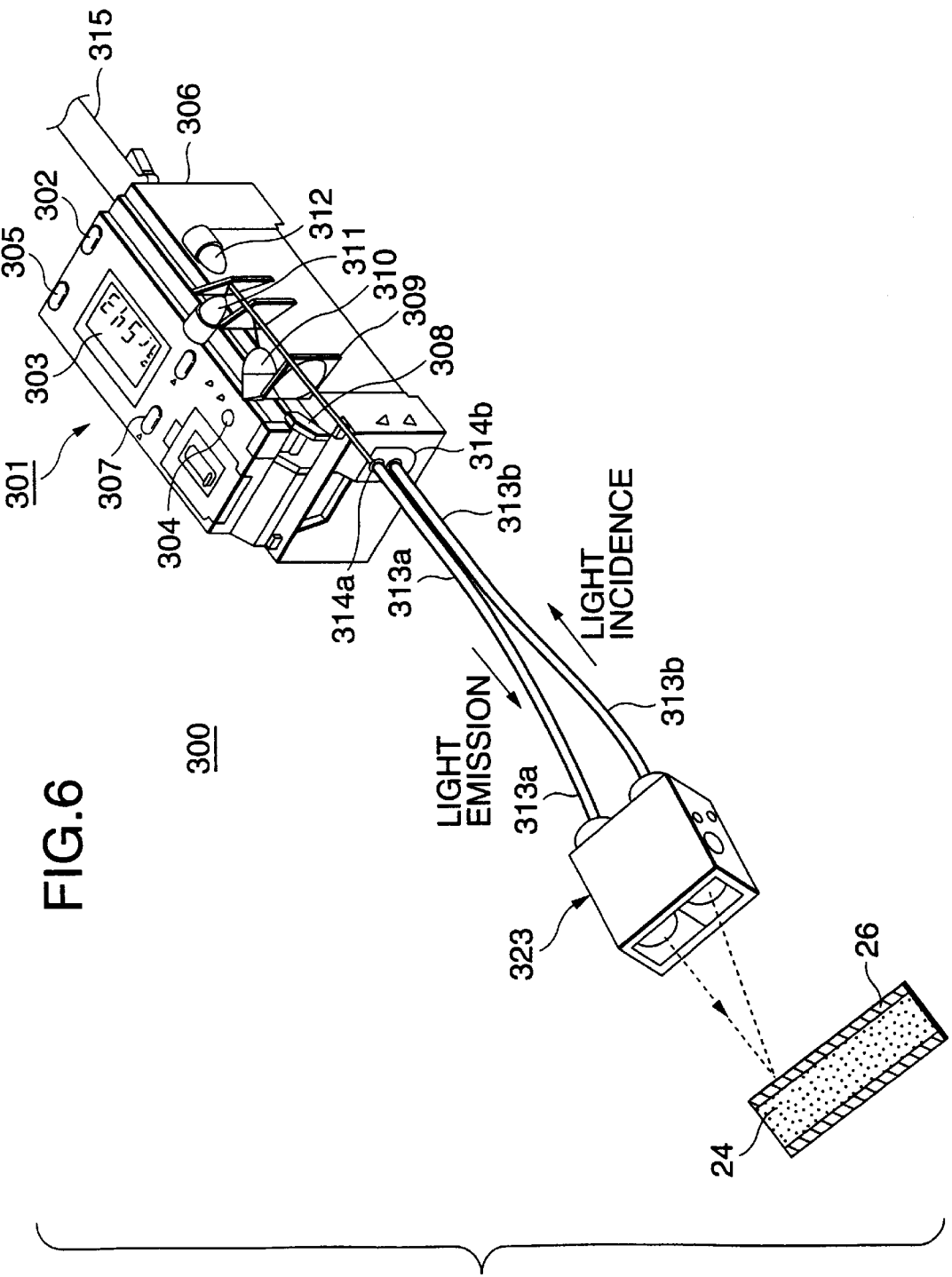

FIG. 6 is a perspective views showing a color identifying sensor.

Figure 7:
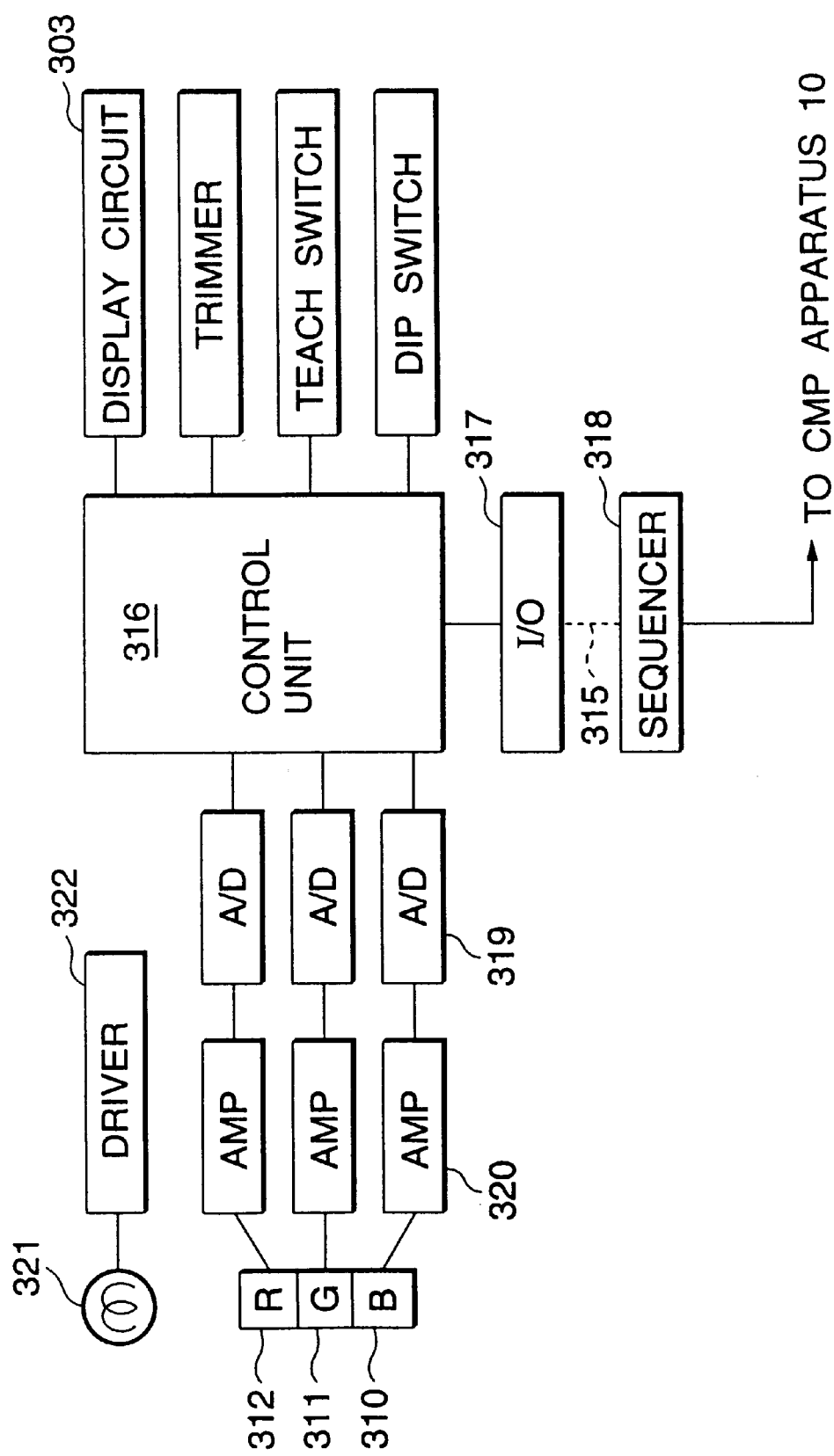

FIG. 7 is a plan view showing a control unit of an amplifier of the color identifying sensor.

Figure 8:
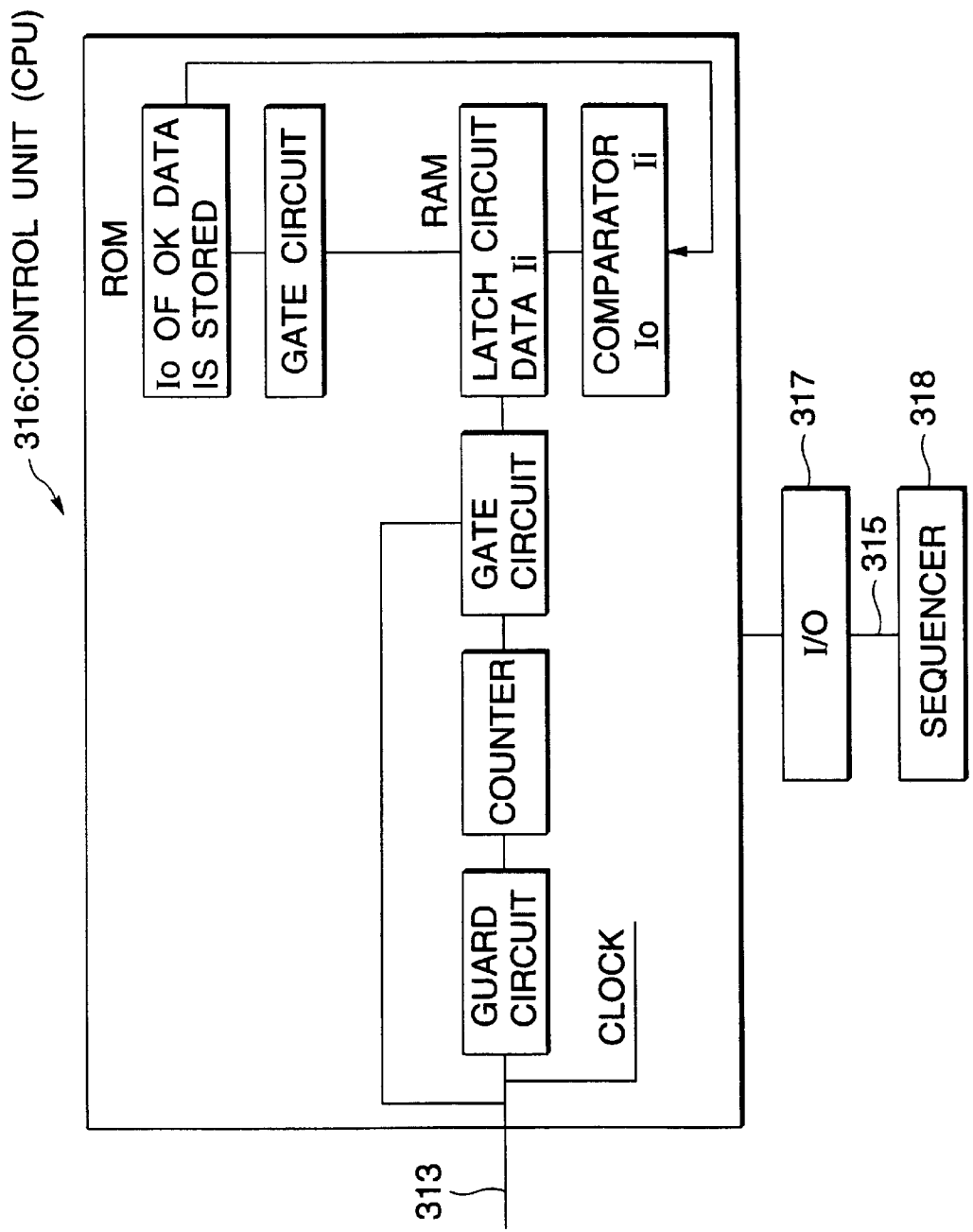

FIG. 8 is a plan view showing the detailed structure of the control unit of the amplifier.

Figure 9:
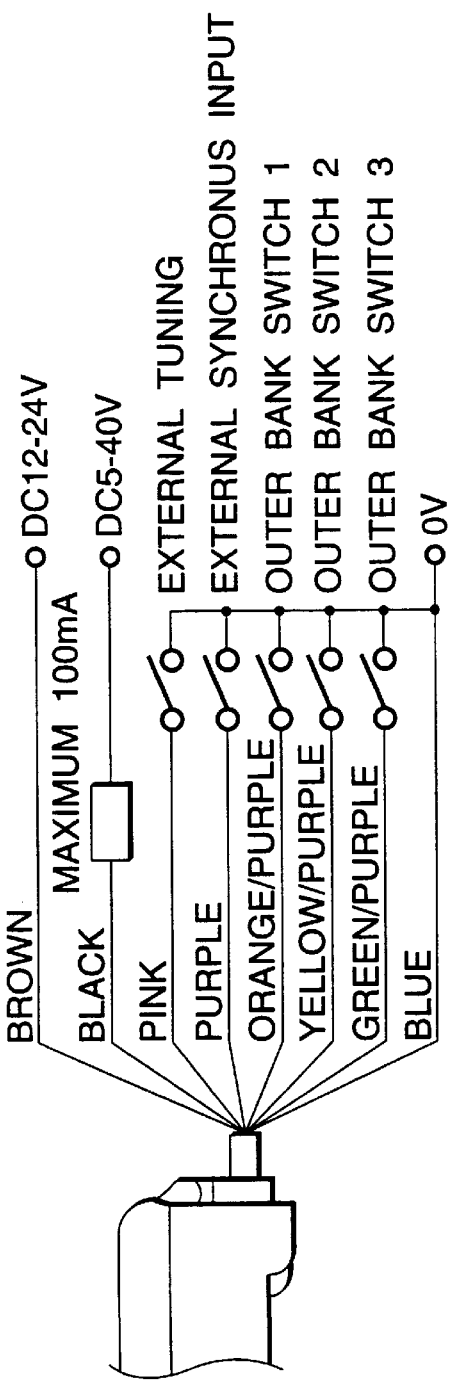

FIG. 9 is a diagram showing connections in an input/output circuit of the color identifying sensor.

Figure 10:
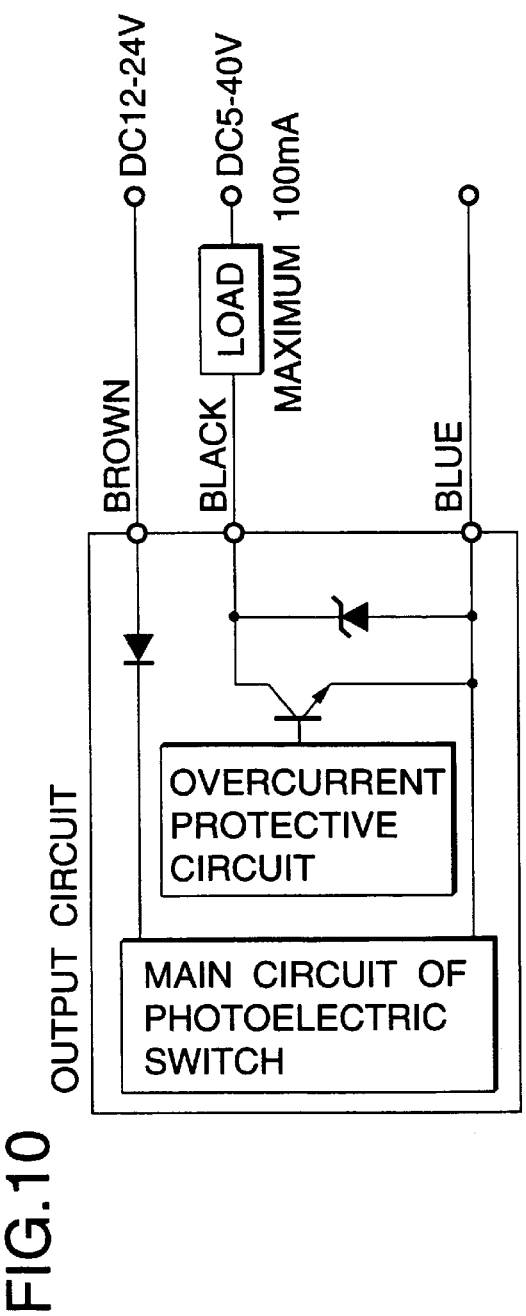

FIG. 10 is a diagram showing the output circuit of the color identifying sensor.

Figure 11:
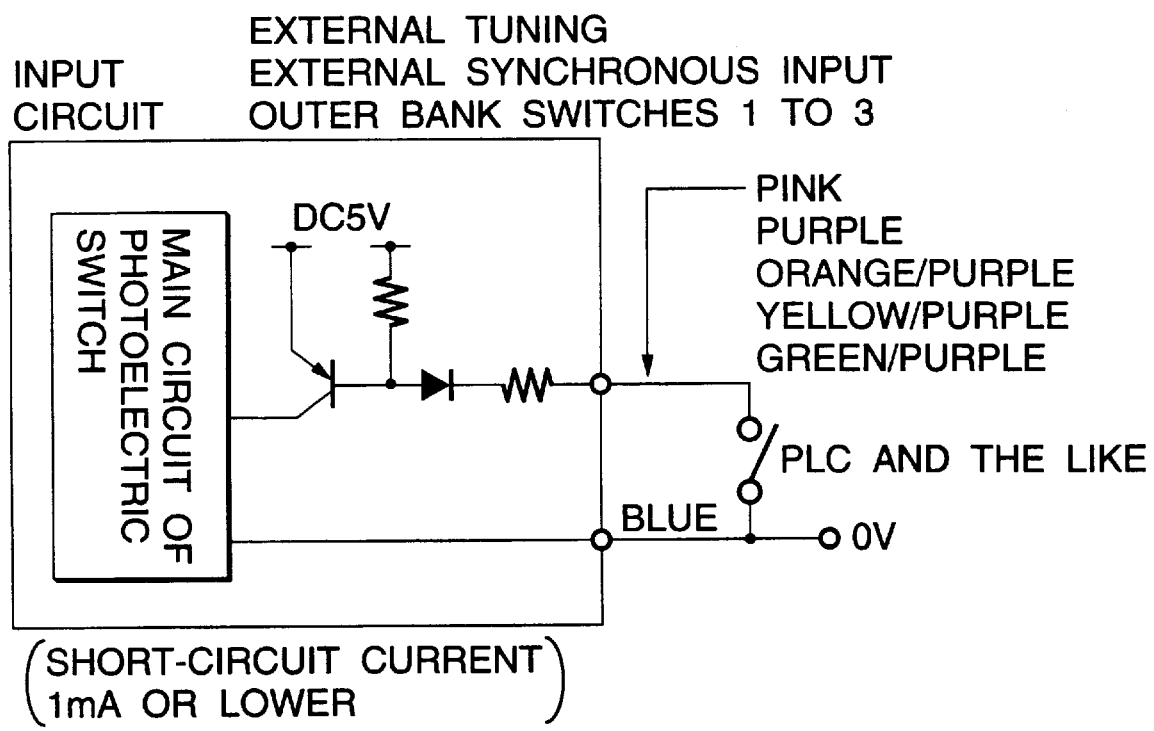

FIG. 11 is a diagram showing the input circuit of the color identifying sensor.

DETAILED DESCRIPTION OF THE PRESENT INVENTION

The present invention will now be described in detail with reference to the accompanying drawings. (Wafer to be processed)

A wafer to be processed of the present invention has a substrate made of silicon, an alumina-titanium carbide alloy or LCD glass. A permalloy magnetic layer made of, for example, Ni—Fe, Mn—Fe, Co—Fe, Ni—Rh—Fe, Co—Zr—Fe or Co—Fe—B is formed on the surface of the foregoing substrate. If necessary, a circuit made of Cu, Ag or Au is formed thereon. Then, an insulating layer made of aluminum oxide or the like is formed so that the wafer is formed. Also the present invention may be applied to a substrate for a device incorporating an interlayer insulating film made of aluminum oxide, silicon dioxide or titanium oxide on which a metal film made of titanium or titanium-aluminum is formed.

(CMP Polishing apparatus)

FIG. 3 shows a CMP polishing apparatus 10 of the present invention. In the CMP polishing apparatus 10, a wafer "w" is vacuum-adsorbed to a chuck table (plate) 14. Then, a platen 15 to which a polishing cloth 15a is bonded is pressed against, the upper surface of the wafer. While supplying abrasive material slurry 13 to the upper surface of the wafer, the platen and the wafer are rotated to polish the wafer. Instead of the platen, a polishing tape may be used as a substitute for the platen.

Alternatively, FIGS. 4 and 5 show another CMP apparatus 10 arranged such that a wafer "w" is bond to a head or vacuumed onto the chuck plate 11. Then, the wafer w is pressed against a platen 12 to which a polishing cloth 12a is bonded. While supplying abrasive material slurry 13 to the platen 15, the platen and the semiconductor wafer are rotated so that the chemimechanical polishing (CMP) apparatus 10 polishes the wafer.

(Abrasive Material Slurry)

The components of the abrasive material slurry for use to perform the CMP polishing operation vary according to the composition, the structure and an amount of polishing of the wafer to be polished.

For example, when a permalloy layer is polished, aqueous abrasive material slurry may be employed which contains (a) abrasive grains having an average particle size of 0.05 mm to 1 mm in a quantity of 0.1 wt. % to 10 wt %, (b) an inorganic salt selected from water-soluble inorganic aluminum salts and nickel salts in a quantity of 0.1 wt % to 3 wt %; and (c) an aqueous chelating agent.

Aluminum oxide, cerium oxide, single-crystal diamond, polycrystal diamond, silicon oxide, silicon carbide, chromium oxide or glass powder may be used as the abrasive grains. The average particle size of the abrasive grain to be used is 0.1 $\mu$m to 1.0 $\mu$m, preferably 0.3 $\mu$m to 0.5 $\mu$m. The quantity of the abrasive grains having the component (a) with respect to the abrasive material slurry varies according to the type of the abrasive grains and purpose of the same. The quantity is 0.05 wt % to 10 wt %, preferably 0.1 wt %. If the quantity is smaller than 0.05 wt %, a practical polishing rate of layer removed cannot be realized. If the quantity is larger than 10 wt %, the effect cannot furthermore be improved. What is worse, use of the abrasive grains in a large quantity causes an economic disadvantage.

The component (b) which is the water-soluble inorganic salt or the nickel salt being an inorganic slat improves the polishing rate. The component (b) is exemplified by acetate of aluminum or nickel, hydrochloride, sulfate, phosphate and thiosulphate. Specifically, the foregoing component is any one of the following materials: aluminum nitrate, nickel nitrate, aluminum sulfate and the like. The water-soluble inorganic salt is contained in the polishing-material slurry in a quantity of 0.1 wt % to 3 wt %.

The water-soluble chelating agent which is the component (c) is added to the slurry in order to raise the polishing rate and flatten the obtained wafer. The water-soluble chelating agent is exemplified by ethylene diamine tetraacetic acid (EDTA), ethylene diamine tetraacetate disodium (EDTA-2Na), alkali metal salt of aminosulfonic acid-N,N-diacetate, alkali metal salt of 2, 2-dimethylpropane bisoxide, diethylene triamine pentaacetate and its sodium salt. The chelating agent which is the component (c) is contained in the abrasive material slurry in a quantity of 0.1 wt % to 3 wt %.

To the polishing-material slurry, aqueous medium, polishing oil, a rust-preventive agent, a dispersing agent, an antiseptic agent, an antifoaming agent and a pH adjuster and the like are added.

The dispersing medium may be composed of only water or a mixture, the main component of which is water (in a quantity of 70 wt % to 99 wt % of the dispersing medium) and a sub-component of which is water-soluble organic solvent, such as alcohol or glycol (in a quantity of 1 wt % to 30 wt %. It is preferable that water is obtained by filtration using a 0.1 mm cartridge filter to satisfactorily remove giant particles. Alcohol may be methyl alcohol, ethyl alcohol or isopropyl alcohol. The glycol may be ethylene glycol, tetramethylene glycol, diethylene glycol, propylene glycol or polyethylene glycol The quantity of the water-soluble dispersing medium which is contained in the abrasive material slurry is 70 wt % to 99 wt %, preferably 90 wt % to 99 wt %. If the quantity is smaller than 70 wt %, the viscosity of slurry is raised excessively to smoothly supply the abrasive material slurry to the surface of the substrate and stably preserve slurry.

Polishing oil having a function of a polishing improver and an agent for dispersing abrasive grains is exemplified by a variety of surface active agents, ethylene glycol, propylene glycol, polyethylene glycol, polyoxyethylene alkylether, polyoxyethylene alkylphenylether, and pulonic-type non-ion surface active agent (addition reactant of ethylene oxide and propylene oxide).

The surface active agent may be an anion surface active agent, a cation surface active agent, a nonion surface active agent, an ampholytic surface active agent, use of both of the anion surface active agent and the nonion surface active agent, use of both of the anion surface active agent and the ampholytic surface active agent, use of both of the cation surface active agent and the nonion surface active agent or use of both of the cation surface active agent and the ampholytic surface active agent. The foregoing materials are mixed by 0.1 wt % to 3 wt %.

The dispersion assisting agent is exemplified by hexametaphosphate soda, oleic acid and monobasic calcium phosphate. The ph adjuster is exemplified by potassium hydroxide, sodium hydroxide, morpholine and ammonia water. The rust-preventive agent is exemplified by a nitrogen-containing organic compound, such as a condensation product of alkanolamine-alkanolamine borate, monoethanol amine, diethanol amine, triethanol amine, alkanol amine borate or benzisothiazone. The anti-foaming agent is exemplified by liquid paraffin, dimethylsilicon oil, monostearate di-glyceride mixture and sorbitan monopalmityate.

(Detection of End of Polishing)

A method of detecting an end point of polishing arranged to perform CMP polishing with which an insulating layer of a wafer incorporating a substrate having a metal-containing permalloy layer formed thereon and the insulating layer formed on the metal-containing permalloy layer is chemimechanically polished to expose the flat permalloy layer, the method of detecting an end point of polishing comprising the steps of: collecting abrasive material slurry on a surface plate 12a or w for polishing as a continuous flow from the start or during CMP polishing; continuously mixing a color developing reagent with the collected continuous flow to prepare a specimen for the continues flow; reading the color of the specimen as a digital value (Ii) by a color identifying sensor; and determining a moment of time at which the digital value (Ii) reaches a digital value (Io) of a specimen of a waste flow of the abrasive material slurry at the end of polishing to be the end of polishing.

The discharged metal-containing waste solution of the abrasive material slurry is added with the reagent which develops color in the presence of metal ions. If necessary, an oxidizer and a buffer are added to cause the waste solution of the abrasive material slurry to develop color. The developed color of the solution is read by the color identifying sensor and converted into a digital value.

When attention is focused on the iron which is the metal contained in the permalloy layer, the color value of the waste solution of the abrasive material slurry containing the compound caused to develop color by the reagent owing to iron ions is read.

That is, the iron ions serve as catalysts. If the density of the iron ions is high, the color developing reaction proceeds quickly. Thus, the color of the waste solution of the abrasive material slurry is changed as the density of the iron ions is raised. Therefore, the color value (Io) of the waste solution of the abrasive material slurry realized when the CMP polishing process has been completed is previously obtained by performing an experiment. The color value (Io) is input to the ROM of the central processing unit (CPU).

The reagent for developing color in the presence of iron ions is exemplified by N,N-dimethyl-p-phenylenediamine, N, N-diethyl-p-phenylene diamine, o-phenanthroline and sodium thiocynate. In particular, it is preferable that N-dimethyl-p-phenylenediamine or N,N-diethyl-p-phenylene diamine exhibiting excellent sensitivity with respect to iron ions is employed.

The color development of N,N-dimethyl-p-phenylenediamine is performed when the pH is 5.0 or higher, preferably 5.5 to 7. The buffer is added to the waste solution. The buffer is exemplified by mixture solution of acetic acid and sodium acetate, mixture solution of phosphoric acid and ammonium phosphate and mixture solution of sulfuric acid and ammonium sulfate. Since the N,N-dimethyl-p-phenylenediamine solution can easily be oxidized with air, it is preferable that the pH is previously brought to the acidic region by adding an acid material, such as sulfuric acid or hydrochloric acid. As an alternative to this, buffer is added to bring the pH to the acidic region.

Since color development of N,N-dimethyl-p-phenylenediamine is caused by oxidation, an oxidizer is added to quickly complete color development. As the oxidizer, hydrogen peroxide water is employed which is a low-cost material and which exhibits easy handling.

The color development of N,N-dimethyl-p-phenylenediamine is exemplified by the following chemical formula:

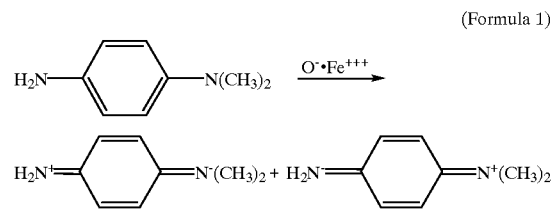

(Formula 1)

Oxidation of the reagent causes two derivatives. As the polishing duration elapses, an amount of the iron ions for performing the catalyst action increase. Thus, according to the reaction proceeding, the color of the waste solution changes.

The color of the waste solution of the abrasive material slurry of the specimen is darkened from clouded color which is realized when no Fe ion is contained to light pink, light red purple and dark purple as the oxidation reaction of iron ions proceeds.

The digital color value of the specimen realized when the identification of the color of the specimen has been started by the color identifying sensor as the digital color value of the waste solution of the abrasive material slurry of the specimen is set to be, for example, 999. The color value (Io) of the waste solution of the abrasive material slurry which has been obtained by performing the experiment and realized when the CMP process has been completed is input to the ROM.

For example, the digital color value of the waste solution of the abrasive material slurry of the specimen is set such that the digital value of the specimen of cloudy solution which does not contain any Fe ion and which is realized when the identification of the color of the specimen has been started by operating the color identifying sensor is set to 999. Moreover, the color value (Io) of light red purple of the waste solution of the abrasive material slurry which has been obtained by performing the experiment and which is realized when the CMP process has been completed is set to be 985 which is input to the ROM.

When iron ions are contained in the abrasive material slurry, the color value (Io) of the waste solution of the abrasive material slurry realized when the polishing process has been completed is, as a matter of course, obtained by performing an experiment to input the obtained color value (Io). Therefore, the value does not always coincide with the foregoing value of, for example, 985. As a matter of course, the color of the waste solution of the abrasive material slurry realized when the CMP process has been completed is sometimes dark purple. The digital value is sometimes 940.

FIG. 4 shows an example of a CMP polishing apparatus to which the foregoing detection unit is joined.

Waste solution 16 of the abrasive material slurry is gathered into a chute 17 disposed at an outer end owing to centrifugal force generated by the rotation of a platen or a chuck table. Then, the waste solution 16 of the abrasive material slurry is supplied to a pipe 19a by a pump 18a. Then, the waste solution 16 of the abrasive material slurry is, in a mixing portion 21a, mixed with buffer solution 20 supplied to a pipe 19b by a pump 18b. Thus, the pH of the waste solution is adjusted to be 5 or higher, preferably 5.5 to 7.0. Then, solution 22 of reagent is supplied to a pipe 19c by a pump 18c so as to be, in a mixing portion 21b, mixed with the waste solution containing the buffer. Then, hydrogen peroxide solution 23 is supplied to a pipe 19d by a pump 18d so as be mixed in a mixing portion 21c so that specimen solution 24 is prepared. The specimen solution 24 is heated to 40° C. to 80° C. by heaters 25. When the specimen solution 24 passes through a cell 26 of a detecting unit, the waste flow of the abrasive material slurry of the specimen is irradiated with light beams in three colors by a color identifying sensor 300. The color of reflected light is converted into a digital value (Iron ions) The digital value (Ii) is compared with the color value (Io) of the waste flow of the abrasive material slurry realized in an optimum polishing state and previously input to the ROM. When the two values coincide with each other, an instruction to complete the polishing operation is issued from the CPU to the CMP apparatus. Thus, the chuck mechanism or the polishing surface plate of the CMP apparatus is vertically moved. Then, the rotation is stopped to complete the CMP operation for polishing the wafer is completed.

Figure 1:
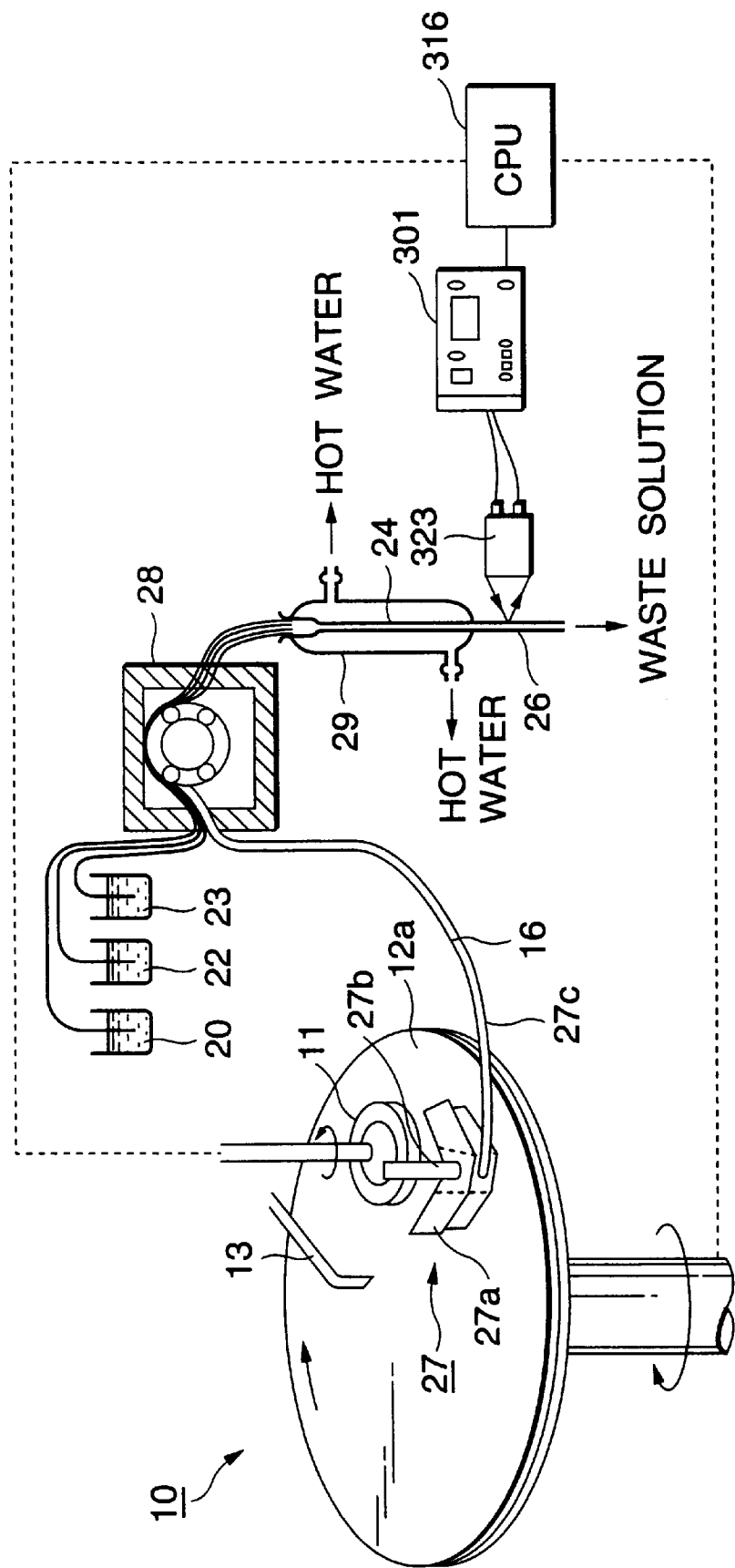
FIG. 1 is a front view showing a CMP apparatus having an apparatus for detecting an end point of polishing.
Figure 2A:
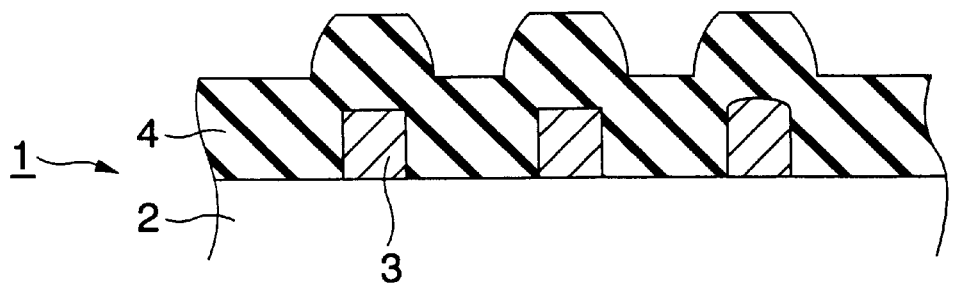
Figure 2B:
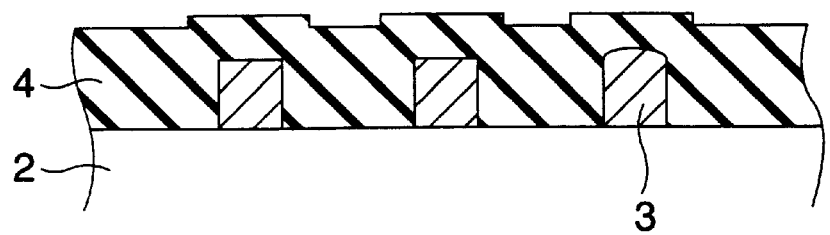
Figure 2C:
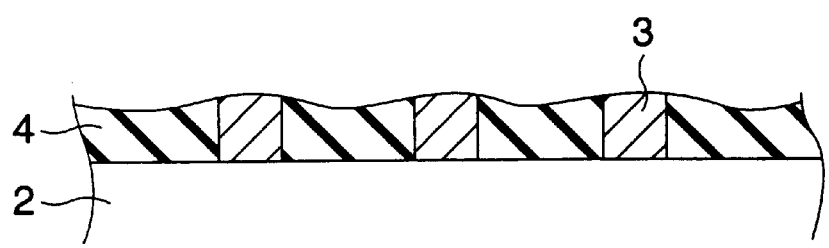
Figure 2D:
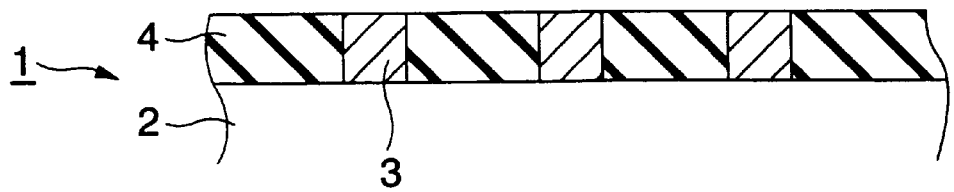

FIG. 1 shows an example of the CMP apparatus 10 in a state in which another apparatus for detecting an end point of polishing has been joined. The apparatus for detecting an end point of polishing incorporates a scraper 27 for collecting waste solution of abrasive material slurry 13 on a polishing surface plate 12a; a roller pump 28 for pumping up the waste solution of abrasive material slurry collected by the scraper as a continuous flow to send the waste solution of the abrasive material slurry collected by the scraper to a temperature regulator; a reagent supply mechanism for continuously supplying color-developing reagents 20, 22 and 23 to the flow of the waste solution of the abrasive material slurry pumped up by the roller pump; a color identifying sensor 300 for reading, as a digital value, the color of a specimen of the waste flow of the abrasive material slurry containing the color-developing reagent sent to the temperature regulator 29; a mechanism for making a comparison between the digital value (Ii) read by the color identifying sensor and a digital value (Io) of a specimen of the waste flow of the abrasive material slurry containing the color-developing reagent in a state where CMP polishing has been completed which has been read by a color identifying sensor and input previously; a mechanism for transmitting a signal when the measured value (Ii) has reached the value (Io) input previously; and a mechanism for indicating completion of CMP polishing of the wafer in response to the signal.

The vertical movement of the scraper 27; is performed by moving a shaft 27a cylinder (not shown). The waste solution of the abrasive material slurry is pumped up through a solution inlet opening 27b of the scraper 27 by a roller pump 28. Then, the waste solution of the abrasive material slurry is allowed to pass through a pipe 27c so as to be mixed with the color-developing reagent. Then, the specimen in the form of a continuous flow is introduced into a temperature regulator 29 set to a predetermined temperature of 40° C. to 80° C. Thus, the color developing reaction is enhanced so that the developed color of the specimen flow is read by the color identifying sensor 300.

The color identifying sensor 300 irradiates the specimen with light beams in three colors which are red, green and blue to detect the color components of light by converting reflected light to an optical fiber thereof. The color identifying sensor 300 is a digital color identifying sensor for identifying the degree of coincidence with registered reference color by using 0 to 999. Moreover, the color identifying sensor recognizes the digital value (Io) of the color component of the waste flow of the abrasive material slurry of the specimen containing the color-developing reagent which has been obtained by performing the experiment and which has been realized when the CMP process has been completed. When the foregoing color component is recognized, an LED (red) indicating ON is turned on and an LED (green) indicating OFF is turned on. After the sensitivity has been set by depressing a SET button, adjustment can be performed by observing the digital value when the color irregularity or contamination of the thin film is permitted.

A digital color identifying sensor of the foregoing type has been marketted by Keyence which are CZ-41 and CZ-40 (refer to Japanese Patent Laid-Open No. 6-241904). As an amplifier 301 for the color identifying sensor, CZ-V1 has been marketted. When an A/D converter FS01 (trade name) for forming 12-bit data of the quantity of received light is included by the apparatus, also the quantity of light can be digital-displayed as well as the sensitivity of the color component. The foregoing sensor has a response time of 300 μs/ms. The output can be switched between a mode in which the output is ON when the color is the same as the recorded color (the registered color) and output is OFF when the color is different from the registered color and a mode in which the output is OFF when the color is the same as the registered color and the output is ON when the color is different from the registered color.

Therefore, control may be performed such that a program for determining an end point of polishing is turned off (completion of polishing) when the digital value of the color identifying sensor has reached Io and turned on (continuation of polishing) when the digital value does not reach the same.

FIG. 6 shows an example of a color identifying sensor 300 including an amplifier 301 and an optical fiber unit 313.

The amplifier 301 has a set button 302, an LED digital numeral display monitor 303, an output display lamp 304, a mode changing switch 305, an output changing switch 306, a set-value adjustment key 307, an optical fiber 308, a lens 309, a green LED 310, a blue LED 311, a red LED 312, connectors 314a and 314b to which optical fibers 313a and 313b are connected, and a cable 315 to which external units, such as a sequencer, are connected.

The body of the amplifier has a control unit 316 structured as shown in FIGS. 6 and 7. The control unit being a CPU comprises a microcomputer having a ROM in an OK-data (m) storage portion and a RAM in a data rewriting latch circuit portion. The cable 315 is connected to the amplifier through an I/O port 317. The external unit 318, such as the sequencer, is connected to the cable. The red LED 312, the green LED 311 and the blue LED 310 are connected to the control unit 316 through the A/D converter 319 and the amplifier (AMP) 320. The foregoing elements are disposed in a line in such a manner that the optical axes run in line with one another as shown in FIG. 3. The foregoing elements are connected to the connector 314a. A halogen lamp 321 is disposed at a position extended from the connector 314b so as to be turned on/off by a driver 322.

An optical fiber unit 313 which is connected to the amplifier 301 incorporates a detecting end 323 for irradiating the subject (a thin film of grinding solution) w which must be detected with light to receive reflected light from the subject w. The detecting end 323 is connected to optical fibers 313a and 313b. The optical fiber is a light emitting fiber into which light is introduced from a halogen lamp 321 disposed in a connector 314b. The optical fibber 313a is a light receiving fiber. FIG. 8 shows the detailed structure of a unit for controlling the amplifier, FIG. 9 shows connections of input/output circuits, FIG. 10 shows the output circuit and FIG. 11 shows the input circuit.

When the specimen flow is irradiated with light emitted from the color identifying sensor 300 through the detecting end 323 as shown in FIG. 6, light reflected from the specimen flow is made incident on sensors 310, 311 and 312 from the detecting end 323 through the connector. Thus, the digital value of the color is displayed by using values from 0 to 999.

The digital value Ii realized owing to color development of iron ions using color development caused due to oxidation of N,N-dimethyl-p-phenylenediamine was 985.

The color development realized by using oxidation of N,N-dimethyl-p-phenylenediamine may be used to realize color development of ions, such as ternary Co ions, Di ions, Mo ions or Mn ions having the catalyst action similar to that of iron.

When the metal is nickel, color development of Ni ions may be realized by dimethyl oxime.

Examples of the present invention will now be described.
(Preparation of Abrasive Material Slurry)

Dissolution or 0.5 part by weight or aluminum nitrate and 0.5 part by weight of diethylenetriamine pentaacetate in 95 parts by weight of water allowed to pass through a 0.1 μm cartridge filter was performed.

Aluminum oxide particles having an average particle size of 0.5 μm in a quantity of 2.5 parts by weight, lauryl alcohol polyoxyethylene ether in a quantity of 1.0 part by weight and polyethylene glycol (having a molecular weight of 200) in a quantity of 2.0 parts by weight were mixed with 93.5 parts by weight of a filtrate by a homogenizer. Thus, abrasive material slurry was prepared.

After a lapse of five days, crystal which was not dissolved in water was removed from the solution by filtration.

Aluminum oxide particles having an average particle size of 0.5 μm in a quantity of 2.5 parts by weight, lauryl alcohol polyoxyethylene ether in a quantity of 1.0 part by weight and polyethylene glycol (having a molecular weight of 300) in a quantity of 2.0 parts by weight were mixed with 93.5 parts by weight of a filtrate by a homogenizer. Thus, abrasive material slurry (having an Fe ion density of 0.0000 ppm) was prepared.
(Measurement of Density of Iron)

A magnetic recording disk wafer was prepared. The magnetic recording disk has an aluminum titanium carbonate substrate on which a permalloy layer constituted by Ni (81.9 wt %)—Fe (18.1 wt %) and having a thickness of 3000 nm was formed. Moreover, an aluminum oxide insulating layer was formed on the permalloy layer by a sputtering method. The magnetic disk wafer was joined to a chuck mechanism such that the surface of the substrate was sucked. On the other hand, the surface of the insulating layer of the semiconductor wafer was pressed (pressure: 400 g/cm$^2$) against the surface of a polishing cloth of a platen disposed on the lower surface of the chuck mechanism while abrasive material slurry was being dropped. Then, a polishing operation was performed for three minutes such that the revolving speed of the platen was 45 rpm and that of the chuck mechanism was 45 rpm. An optimum result was obtained such that a small difference in level of 680 Å and small surface roughness (Ra) of each of the permalloy layer and the insulating layer of about 6 Å were observed.

Then, colorimetric analysis was performed (an absorbing wavelength of 550 nm) by using 1 cc/minute of waste solution of the abrasive material slurry, buffer solution (solution in a quantity of one litter prepared by dissolving acetic acid in a quantity of 0.2 mole and sodium acetate in a quantity of 0.2 mole in pure water) in a quantity of 1 cc/minute, 1 wt % N, -dimethyl-p-phenylene diamine solution in a quantity of 1 cc/minute and 1 wt % hydrogen peroxide water in a quantity of 1 cc/minute. Thus, the concentration of ternary iron ions in the waste solution of the abrasive material slurry was 0.60 ppm. The concentration of Ni metal in the waste solution of the abrasive material slurry analyzed by another method was 5.1 ppm.
(Detection of End Point of Polishing)

The scraper 27 was moved downwards to a position of about 30 mm adjacent to the wafer chuck mechanism immediately after the CMP process was started with the surface of the polishing cloth 12a of the platen of the polishing apparatus 10 shown in FIG. 1. Then, abrasive material slurry with which the polishing process was being performed was supplied to the pipe 27c of the scraper 27 by the roller pump at a rate of 1 cc/minute. Moreover, the buffer solution, N,N-dimethyl-p-phenylene diamine solution and hydrogen peroxide solution were supplied to the pipe at a rate of 1 cc/minute. Thus, a waste flow of the abrasive material slurry of the specimen containing the color-developing reagent was prepared. The flow of the specimen was introduced into a Liebig's pipe which was the temperature regulator 29 and which had an outer shell along which hot water set to 80° C. flowed. Then, the color of the waste solution of the abrasive material slurry allowed to pass through the cell 26 was read by the color identifying sensor 300.

The color value (Io) realized after the polishing process was competed and measured previously by performing an experiment was 985. The digital value realized at the start of the polishing process was 999.

The color value (Io) of 985 realized in an optimum polishing state was input to the ROM.

The operation mode of the CMP apparatus was switched from a manual mode to an automatic mode. The moment of time at which the value of Ii and that of Io coincided with each other was the end point of the polishing process. Thus, twenty wafers was automatically polished by the CMP method.

The surface roughness of the permalloy alloy of the polished wafer was measured by a surface roughness meter (ET30HK manufactured by Komatsu) under conditions that the measured length was 0.25 mm, a 0.5 μmR stylus was used, a load of 3 mg was applied and the velocity was 20 μm/second. As a result, the surface roughness was about 6 Å (Ra).

A surface discontinuity analyzing apparatus using a laser beam was operated to measure the surface of the permalloy alloy. The number of scratches having widths of 1 μm to 3 μm and lengths of 20 μm or shorter was measured. As a result, no microscratch was detected.

The method of detecting an end point of CMP of a wafer according to the present invention is structured to substantially analyze the composition of the permalloy layer of the polished wafer. Therefore, the end point of polishing can furthermore precisely be detected as compared with the conventional end point digital method.

What is claimed is:

1. A method of detecting an end point of polishing of a wafer having a substrate; a permalloy layer containing a metal and formed on the substrate; and an insulating layer formed on the permalloy layer, the method comprising the steps of:

chemimechanically polishing the insulating layer of the wafer with slurry on a surface plate;

collecting a waste solution containing the slurry on the surface plate as a continuous flow from the start time or during the polishing;

continuously mixing a color developing reagent with the continuous flow of the waste solution to prepare a specimen;

reading the color of the specimen as a digital value (Ii) by a color identifying sensor;

comparing the digital value (Ii) with a predetermined digital value (Io) showing an end time of the polishing; and stopping the polishing if the digital value (Ii) reaches the predetermined value (Io), whereby the permalloy layer is exposed in flat.

2. The method as claimed in claim 1, wherein the metal contained in the permalloy layer is iron, the color developing reagent contains coloring matter and hydrogen peroxide water, and the value detected by the color identifying sensor as the digital value (Ii) is a color value of the specimen of the continuous flow of the waste solution color-developed owing to iron ions in the slurry.

3. The method as claimed in claim 2, wherein the coloring matter is N,N-dialkyl-p-phenylene diamine, where the number of carbon atoms in the alkyl group is 1 or 2.

4. The method as claimed in claim 2, further comprising the step of adding a buffer solution to the specimen of the waste solution.

5. The method as claimed in claim 1, wherein the metal contained in the permalloy layer is nickel, and the color-developing reagent is dimethyl oxime.

* * * * *